(12) United States Patent  (10) Patent No.: US 7,009,933 B2
Gan  (45) Date of Patent: Mar. 7, 2006

(54) TRAFFIC POLICING OF PACKET TRANSFER IN A DUAL SPEED HUB

(75) Inventor: Kuo-Chung (Cliff) Gan, Hsin Chu (TW)

(73) Assignee: Broadcom Corporation, Irvine, CA (US)

( * ) Notice: Subject to any disclaimer, the term of this patent is extended or adjusted under 35 U.S.C. 154(b) by 901 days.

(21) Appl. No.: 09/978,024

(22) Filed: Oct. 17, 2001

(65) Prior Publication Data

US 2002/0101877 A1   Aug. 1, 2002

Related U.S. Application Data

(60) Provisional application No. 60/264,723, filed on Jan. 30, 2001.

(51) Int. Cl.
  *G01R 31/08*   (2006.01)
(52) U.S. Cl. ....................... 370/226; 370/228; 709/238
(58) Field of Classification Search ................ None
  See application file for complete search history.

(56) References Cited

U.S. PATENT DOCUMENTS

| | | | |
|---|---|---|---|
| 5,754,552 A * | 5/1998 | Allmond et al. | 370/465 |
| 5,987,507 A | 11/1999 | Creedon et al. | |
| 6,014,704 A * | 1/2000 | Fischer et al. | 709/230 |
| 6,038,215 A * | 3/2000 | Uekumasu | 370/230 |
| 6,115,750 A | 9/2000 | Dillon et al. | |
| 6,311,220 B1 * | 10/2001 | Fischer et al. | 709/230 |
| 6,373,840 B1 * | 4/2002 | Chen | 370/360 |
| 6,396,841 B1 * | 5/2002 | Co et al. | 370/401 |
| 2001/0009553 A1 * | 7/2001 | Homann | 370/445 |
| 2001/0023460 A1 * | 9/2001 | Boucher et al. | 709/250 |
| 2001/0052084 A1 * | 12/2001 | Huang et al. | 714/4 |

FOREIGN PATENT DOCUMENTS

WO    WO 00/56013    9/2000

* cited by examiner

*Primary Examiner*—Bob A. Phunklh
(74) *Attorney, Agent, or Firm*—Squire, Sanders & Dempsey L.L.P.

(57) ABSTRACT

A system for policing traffic of packet transfer in a hub. The system includes a first circuit and a second circuit and a first data line connecting the first circuit to the second circuit, wherein data is transmitted within and between the first circuit and the second circuit across said first data line. A second data line connects the first circuit to the second circuit, wherein data is transmitted within and between the first circuit and the second circuit across the second data line. A monitor monitors the first data line to determine when an amount of data being transmitted on the first data line within the first circuit has reached a threshold. A blocking mechanism prevents data from being transmitted on the first data line from the first circuit to the second circuit when the amount of data being transmitted on the first data line has reached the threshold.

17 Claims, 2 Drawing Sheets

TRAFFIC POLICING OF PACKET TRANSFER IN A DUAL SPEED HUB

REFERENCE TO RELATED APPLICATIONS

This application claims priority to U.S. Provisional Patent Application Ser. No. 60/264,723 filed on Jan. 30, 2001. The contents of the provisional application identified above is hereby incorporated by reference.

BACKGROUND OF THE INVENTION

1. Field of the Invention

The invention relates to a method and apparatus for high performance switching in local area communications networks such as token ring, ATM, ethernet, fast ethernet, gigabit Ethernet and 10 gigabit Ethernet environments.

2. Description of the Related Art

As computer performance has increased in recent years, the demands on computer networks has significantly increased; faster computer processors and higher memory capabilities need networks with high bandwidth capabilities to enable high speed transfer of significant amounts of data. The well-known ethernet technology, which is based upon numerous IEEE ethernet standards, is one example of computer networking technology which has been able to be modified and improved to remain a viable computing technology. A more complete discussion of prior art networking systems can be found, for example, in SWITCHED AND FAST ETHERNET, by Breyer and Riley (Ziff-Davis, 1996), and numerous IEEE publications relating to IEEE 802 standards. Based upon the Open Systems Interconnect (OSI) 7-layer reference model, network capabilities have grown through the development of repeaters, bridges, routers, and, more recently, "switches", which operate with various types of communication media. Thickwire, thinwire, twisted pair, and optical fiber are examples of media which has been used for computer networks. Switches, as they relate to computer networking and to ethernet, are hardware-based devices which control the flow of data packets or cells based upon destination address information which is available in each packet. A properly designed and implemented switch should be capable of receiving a packet and switching the packet to an appropriate output port at what is referred to wirespeed or linespeed, which is the maximum speed capability of the particular network. Basic ethernet wirespeed is up to 10 megabits per second, Fast Ethernet is up to 100 megabits per second, and Gigabit Ethernet is capable of transmitting data over a network at a rate of up to 1,000 megabits per second. The newest Ethernet is referred to as 10 Gigabit Ethernet and is capable of transmitting data over a network at a rate of up to 10,000 megabits per second. As speed has increased, design constraints and design requirements have become more and more complex with respect to following appropriate design and protocol rules and providing a low cost, commercially viable solution.

Referring to the OSI 7-layer reference model discussed previously, the higher layers typically have more information. Various types of products are available for performing switching-related functions at various levels of the OSI model. Hubs or repeaters operate at layer one, and essentially copy and "broadcast" incoming data to a plurality of spokes of the hub. Repeaters in their most generic form have a plurality of ports. Data received in an active receive port is repeated with signal amplitude and timing restored on the re-transmitted or repeated waveforms to all other ports except for the active receive port. If the repeater detects activity from two or more ports, this constitutes a collision, and the repeater will send a jam pattern on all ports, including the active receive ports.

Dual speed hubs operate at two speeds requiring a mechanism capable of bridging or forwarding data across two separate networks operating at different speeds. Layer two switching-related devices are typically referred to as multi-port bridges, and are capable of bridging two separate networks operating at different speeds. Bridges can build a table of forwarding rules based upon which MAC (media access controller) addresses exist on which ports of the bridge, and pass packets which are destined for an address which is located on an opposite side of the bridge. Bridges typically utilize what is known as the "spanning tree" algorithm to eliminate potential data loops; a data loop is a situation wherein a packet endlessly loops in a network looking for a particular address. The spanning tree algorithm defines a protocol for preventing data loops.

SUMMARY OF THE INVENTION

The present invention includes a system for policing traffic of packet transfer in a hub. The system includes a first circuit and a second circuit and a first data line connecting the first circuit to the second circuit, wherein data is transmitted within and between the first circuit and the second circuit across said first data line. A second data line connects the first circuit to the second circuit, wherein data is transmitted within and between the first circuit and the second circuit across the second data line. A monitor monitors the first data line to determine when an amount of data being transmitted on the first data line within the first circuit has reached a threshold. A blocking mechanism prevents data from being transmitted on the first data line from the first circuit to the second circuit when the amount of data being transmitted on the first data line has reached the threshold.

In another embodiment, The invention include a method for controlling data flow. The method includes the steps of transmitting data across a first data line from a first circuit to a second circuit and within the first and second circuits. Data is transmitted across a second data line from the first circuit to the second circuit and within the first and second circuits. The first data line is monitored to determine when an amount of data being transmitted within the first circuit on the first data line has reached a threshold. Data is prevented from being transmitted on the first data line from the first circuit to the second circuit when the amount of data being transmitted on the first data line has reached the threshold.

The invention in another embodiment includes a system for controlling data flow. The system includes a means for transmitting data across a first data line from a first circuit to a second circuit, and a means for transmitting data across a second data line from the first circuit to the second circuit. A means is provided for monitoring the first data line to determine when an amount of data being transmitted within the first circuit on the first data line has reached a threshold, and a means is provided for preventing data from being transmitted on the first data line from the first circuit to the second circuit when the amount of data being transmitted on the first data line has reached said threshold.

BRIEF DESCRIPTION OF THE DRAWINGS

The objects and features of the invention will be more readily understood with reference to the following description and the attached drawings, wherein.

DETAILED DESCRIPTION OF THE PREFERRED EMBODIMENTS

Figure 1:
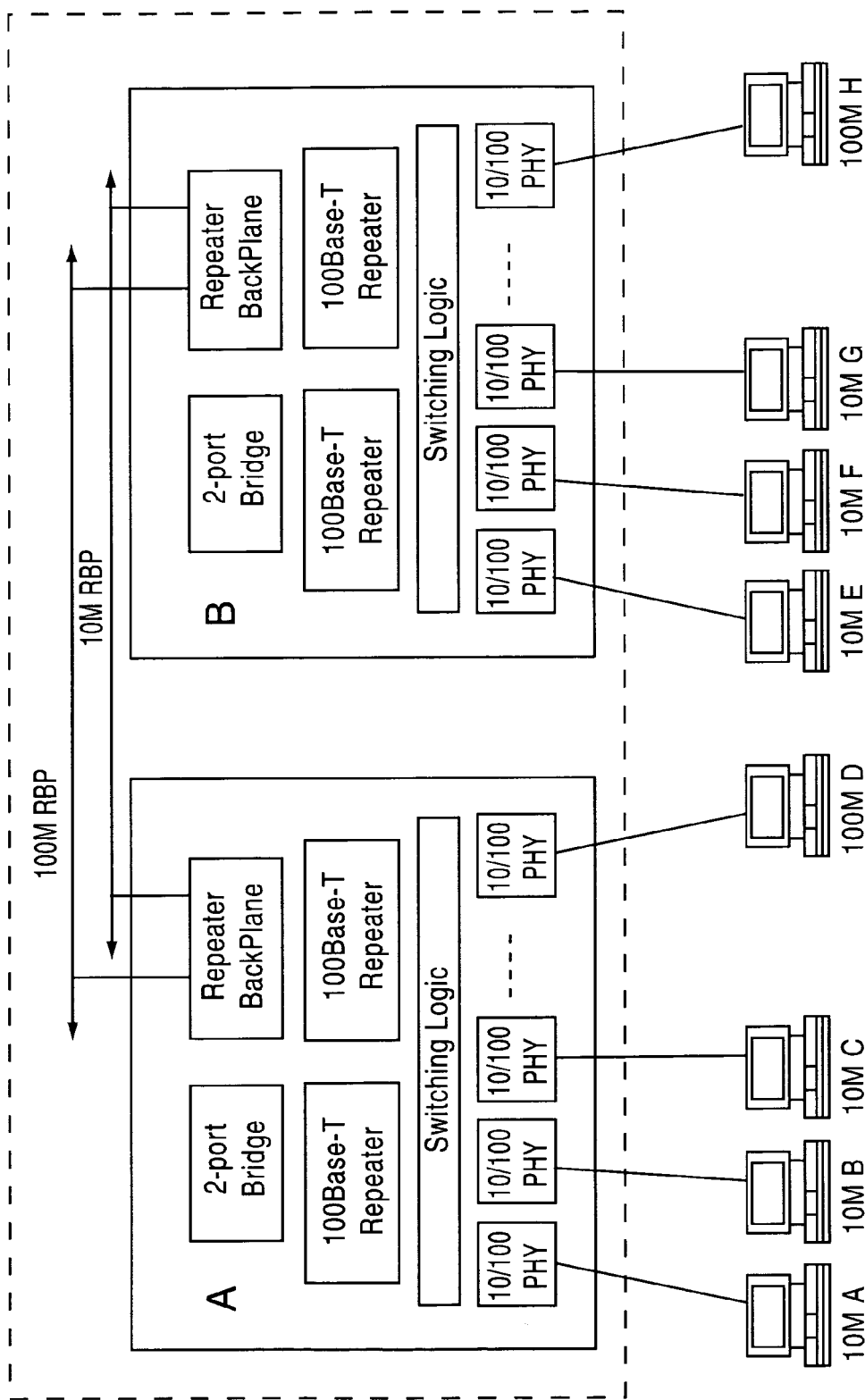
FIG. 1 is a block diagram of two internal state machines that can operate at 10 Mbps and 100 Mbps in accordance with one embodiment of the invention.

Modern integrated circuits can have multiple ports that support different data transfer rates for transmitting and receiving data. FIG. 1 is an illustration of a dual speed hub of the invention having two internal state machines or dual speed hubs A and B. State machine A can have a plurality of ports that can support data transfer rates of 10 Mbps and 100 Mbps. Each of the ports can have a physical element (PHY) that can be connected to a twisted-pair interface using a variety of transmit and receive protocols such as the IEEE 10/100Base-T for example. In one embodiment of the invention, each of the plurality of ports can support 10/100Base-T copper media PHYs. State machine B can also have a plurality of ports that can support 10/100Base-T copper media PHYs. Thus, the two state machines can operate at 10 Mbps and 100 Mbps.

Stations can be connected to each of the plurality of ports in each of the state machines A and B. As illustrated in FIG. 1, the first state machine A can have three stations 10M A, 10M B and 10M C. Each of the stations can be connected to one of the 10/100 PHYs. A station 100M D can also be connected to one of the 10/100 PHYs. Likewise the second state machine B can have stations 10M E, 10M F and 10M G. Each of the stations can be connected to one of the 10/100 PHYs. A station 100M H can also be connected to one of the 10/100 PHYs.

In each of the state machines A and B, switching logic can be connected to each of the plurality of 10/100 PHYs to perform various functions for each incoming packet of data. The switching logic can get information from the packet in order to transmit the packet more efficiently. For instance, the switching logic can associate packets with a port to which the packets are destined to be sent. Associating the packet with ports to which the packets are to be sent and storing these destinations in a table for future use can be useful in speeding up the processing time needed to send a packet to a particular destination. By storing the destination, a packet can be sent directly to a destination instead of having to send the packet to every port in order to find the correct destination. The switching logic can also be used in directing a packet over proper data lines to a designated port.

A two-port bridge can be connected to the switching logic and can be used to forward packets to a proper port. In one embodiment of the invention the two-port bridge can be used to forward a packet at either 10 Mbps or 100 Mbps.

A repeater back plane is connected to the two-port bridge and can have a 10 Mbps data line and a 100 Mbps data line. The back plane connects state machines A and B using a 10M repeater back plane (10M RBP) and 100M repeater back plane (100M RBP). The 10M RBP can be used to transmit packets between 10M stations and the 100M RBP can be used to transmit packets between 100M stations. In FIG. 1 for example, stations 10M A, 10M B, 10M C, 10ME, 10M F, and 10M G are 10M stations and stations 100M D and 100M H are 100M stations.

Each of the state machines have built-in auto-negotiation capability, which allows each of the state machines to poll connected nodes and configure itself. State machine A can be configured to be the master and state machine B can be configured to be the slave. Each of the stations 10M A, 10M B, 10M C, 100M D, 10M E, 10M F, 10M G, and 100M H can be configured to communicate with each other. In one embodiment of the invention the bridge in the master state machine A can be enabled and the bridge in the slave state machine B can be disabled. The bridge can be configured to process packets using functions specified in IEEE std 802.1D.

One of the functions can be to keep a table that associates addresses of packets with ports to which the packets are to be sent. This function can be referred to as address learning. For example, if a first packet is being sent from address L on station 10M A to address M on station 10M E, the 2-port bridge of A can be configured to associate the first packet as being sent from the port associated with address L on station 10M A. Since the packet is originating from station 10M A, the port associated with address L on station 10M A can be referred to as being the source address (SA). A source address lookup can be performed which looks up the source address of the packet in a table such as an address resolution lookup (ARL) table. If the source address cannot be found in the ARL table, this will result in a source address lookup failure (SLF). Since there is a SLF, the source address can be "learned" by associating address L with the port connected to station 10M A in the ARL table.

As addresses are learned, the 10M stations can share the 10M bandwidth and the 100M stations can share the 100M bandwidth. However when a 10M station is to communicate with a 100M station or a 100M station is to communicate with a 10M station, both the 10M bandwidth and the 100M bandwidth can be utilized.

In order to transmit a packet from a station to the a destination, a destination address lookup can be performed by one of the state machines. The ARL table of the state machine can be checked to determine if there is an entry in the ARL table associating the destination address with a port of a station. If there is no entry in the ARL table associating the destination address with a port of a station, this is referred to as a destination lookup failure (DLF) and the packet can be "broadcast" or sent to all ports. For example if the destination address M is not found in the ARL table, the packet can be broadcast to the ports of all stations. The packet can be broadcast to ports of stations 10M A, 10M B, 10M C, 10M F, 10M G on the 10M RBP and ports of stations 100M D and 100M H on the 100M RBP. Thus the packet will eventually be sent to the proper destination address M on station 10M E.

If a packet were being transmitted from station 10M E from address M to address L, an SA lookup of address M in the ARL table would result in an SLF. The address M can be learned by associating the address M with the port associated with station 10M E. Next a DA lookup of the ARL table can result in finding an entry in the ARL table associating address L with the port connected to station 10M A. Thus, the step of "broadcasting" the packet to all ports can be skipped and the packet can be sent directly to the port associated with station 10M A.

One problem that can be encountered is when a high volume of packets are to be transmitted between ports within a single state machine. For example if packets are to be transmitted between stations 10M E and 10M F within state machine B and packets are to be transmitted between stations 10M B and 10M C within state machine A, the amount of data being transmitted on the 10M RBP can begin to increase. As the amount of data being transferred increases on the 10M RBP, the more occurrences of collisions between data being transferred between stations on state machine B (10M E and 10M F) and state machine A (10M B and 10M C). Thus, the performance decreases because data is not being transferred efficiently.

In order to alleviate the problem, when a threshold of traffic of packets being transmitted within stations on a state machine over the 10M RBP is met, it can be beneficial to separate all the 10M stations on state machine A from all the 10M stations on state machine B. Separating the stations on state machine B from the stations of state machine A, can be achieved by preventing any data from being transferred between stations on state machine A and stations on state machine B over the 10M RBP. For example state machine B can be the slave with the 2 port bridge in standby mode and can also have a traffic policing function that monitors the traffic within the same state machine to determine if the traffic has reached a threshold. This threshold can be preset at the factory or set by a system administrator or a user. The state machine A can be the master having a 2-port bridge activated to forward packets on the 10M RBP and 100M RBP. When the traffic policing function determines that the traffic on the 10M RBP has met a threshold, the bridge on the state machine can be set be in forwarding mode.

For example, if the traffic policing function on state machine B determines that the traffic between stations 10M E and 10M F has reached a threshold, the bridge on state machine B can be set to a forwarding mode. This will prevent any data from being transferred over the 10M RBP to state machine A separating stations 10M A, 10M B and 10M C on A from stations 10M E, 10M F and 10M G on state machine B. Thus, the traffic on stations 10M A, 10M B and 10M C can be localized and the traffic on stations 10M E, 10M F and 10M G can be localized thereby preserving the overall performance of each state machine, especially for 10 Mbps transmissions. However, this localization will not prevent stations 10M A, 10M B and 10M C from transmitting packets to stations 10M E, 10M F and 10M G.

Transmission of packets between stations 10M A, 10M B and 10M C on state machine A and stations 10M E, 10M F and 10M G on state machine B can be accomplished by using the 100M RBP. For example, traffic between station 10M A on state machine A and 10M G on state machine B can be transferred to the 100M RBP bridge on state machine A to the 100M RBP bridge on state machine B. The bridge on state machine B can then transfer the packet to the 10M RBP on state machine B to communicate only with stations 10M E, 10M F and 10M G on state machine B. In the case of traffic between stations 10M A and 10M D, the 100M RBP can be used to handle the traffic between stations 10M A and 100M D without having to transmit packets on the 10M RBP on state machine B, since the bridge of state machine B can be configured to know that station 100M D is not located on a 10M RBP.

When the traffic policing function determines that the traffic has fallen below the threshold, the bridge of state machine B can be put into standby mode and stations 10M A, 10M B and 10M C on state machine A and stations 10M E, 10M F and 10M G on state machine B can be combined again to share the 10M RBP. Thus, traffic between station 10M A on state machine A and station 10M G on state machine B will not have to utilize the 100M RBP. Instead, packets can be sent directly between stations 10M A and 10M G over the 10M RBP. This can improve the overall performance and latency time.

Figure 2:
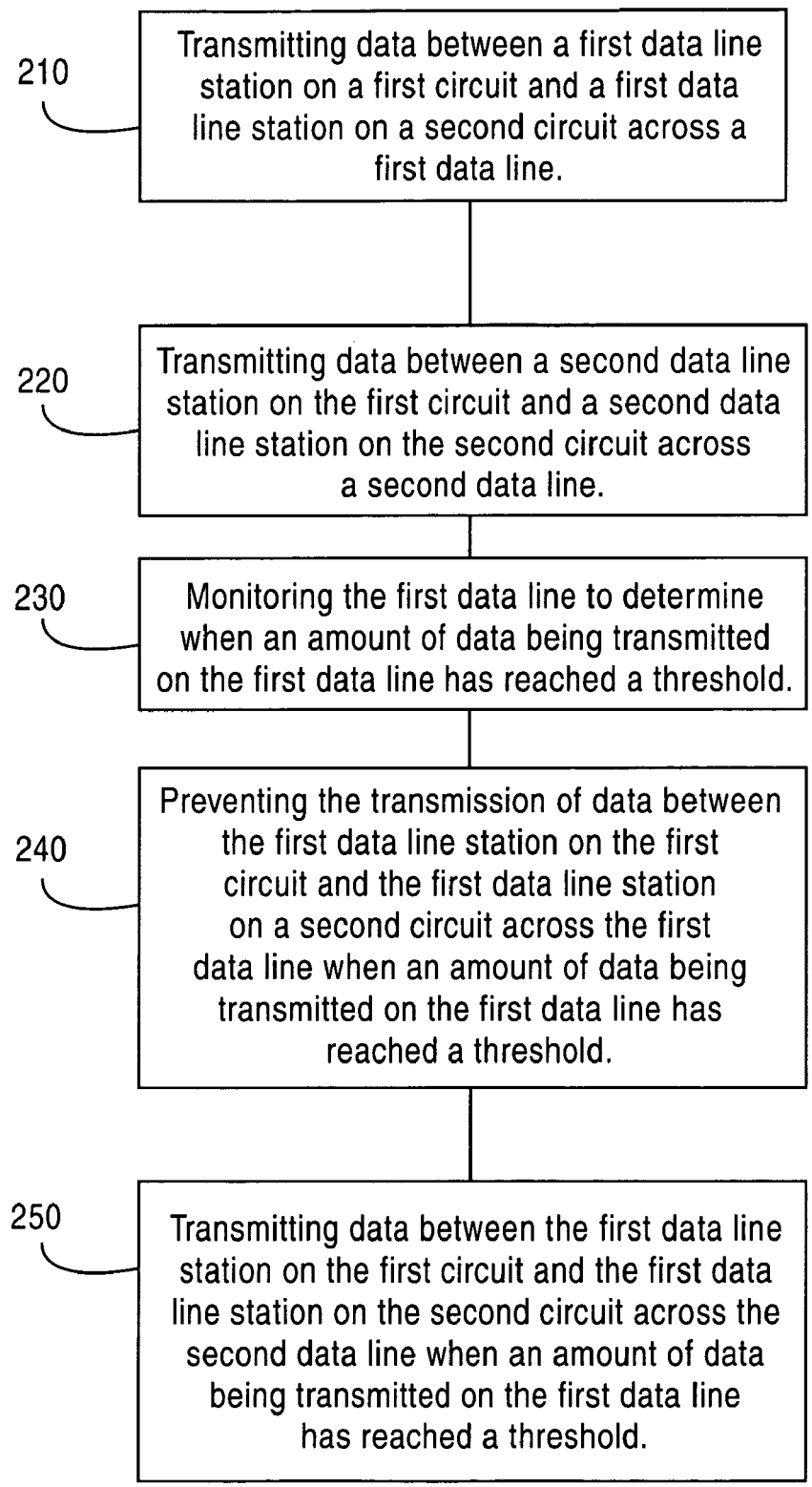
FIG. 2 is a flow diagram of the process steps in accordance with one embodiment of the invention.

FIG. 2 is a flow diagram of the method steps in one embodiment of the invention. In step 210 data is being transmitted between a first data line station on a first circuit and a first data line station on a second circuit across a first data line. For example, data can be transferred between station 10M A on state machine A and station 10M G on state machine B over the 10M RBP.

In step 220, data is transmitted between a second data line station one the first circuit and a second data line station on the second circuit across a second data line. For example, data can be transferred between station 100M D on state machine A and station 100M G over the 100M RBP.

In step 230 the first data line, 10M RBP, is monitored to determine if the traffic on the 10M RBP within state machine B has reached a threshold. Once the traffic reaches a threshold, the transmission of data is prevented in step 240 between the first data line station 10M A on state machine A and the first data line station 10M G on state machine B. Furthermore, stations 10M A, 10M B and 10M C on state machine A and stations 10M E, 10M F and 10M G on state machine B can be separated so that station 10M A, 10M B and 10M C can be localized to communicate with each other on the 10M RBP on state machine A and stations 10M E, 10M F and 10M G can be localized to communicate with each other on the 10M RBP on state machine B. When the traffic on the 10M RBP falls below a threshold the stations are re-connected. Stations 10M A, 10M B and 10M C on state machine A and stations 10M E, 10M F and 10M G on state machine B are not prevented from transmitting data across the 10M RBP. For example, traffic from station 10M A on state machine A can be directly transferred to station 10M G on state machine B over the 10M RBP.

The invention as described can be used in a dual speed hub to utilize the full bandwidth of the hub more efficiently. The invention can be particularly useful when many stations are connected to one of the data lines, such as the 10M RBP as described. In such a case, it is important to localize traffic within a state machine when traffic becomes very heavy within the state machine. In one embodiment as described, when traffic becomes heavy within a state machine on the 10M RBP, traffic is prevented on the 10M RBP between 10M stations on state machine A and 10M stations on state machine B. This localizes the 10M stations preventing degraded performance caused by too many collisions on the 10M RBP. However when the traffic within a state machine falls below the threshold, all 10M stations are reconnected between state machines A and B so that traffic between stations on state machine A and stations on state machine B can be directly transmitted over the 10M RBP.

The above-discussed configuration of the invention is, in one embodiment, embodied on a semiconductor substrate, such as silicon, with appropriate semiconductor manufacturing techniques and based upon a circuit layout which would, based upon the embodiments discussed above, be apparent to those skilled in the art. A person of skill in the art with respect to semiconductor design and manufacturing would be able to implement the various modules, interfaces, and tables, buffers, etc. of the present invention onto a single semiconductor substrate, based upon the architectural description discussed above. It would also be within the scope of the invention to implement the disclosed elements of the invention in discrete electronic components, and/or a corroboration of hardware and software components, thereby taking advantage of the functional aspects of the invention without maximizing the advantages through the use of a single semiconductor substrate.

Although the invention has been described based upon these preferred embodiments, it would be apparent to those of skilled in the art that certain modifications, variations, and alternative constructions would be possible, while remaining within the spirit and scope of the invention. In order to determine the metes and bounds of the invention, therefore, reference should be made to the appended claims.

I claim:

1. A system for policing traffic of packet transfer in a hub, said system comprising:
    a first circuit,
    a second circuit connected to said first circuit;
    a first data line connecting said first circuit to said second circuit, wherein data is transmitted within and between said first circuit and said second circuit across said first data line;
    a second data line connecting said first circuit to said second circuit, wherein data is transmitted within and between said first circuit and said second circuit across said second data line;
    a monitor that monitors said first data line to determine when an amount of data being transmitted on said first data line within said first circuit has reached a threshold;
    a blocking mechanism that prevents data from being transmitted on said first data line from said first circuit to said second circuit when the amount of data being transmitted on said first data line has reached said threshold; and
    a transmitter that transmits data across said second data line, from first ports on said first circuit, to third ports on said second circuit, when the amount of data being transmitted on said first data line has reached said threshold.

2. The system as recited in claim 1,
    wherein said first circuit includes said first ports connected to first data line stations and second ports connected to second data line stations, and
    wherein said second circuit includes said third ports connected to first data line stations, and fourth ports connected to second data line stations,
    wherein data is transmitted on said first data line from said first ports on said first circuit to said third ports on said second circuit.

3. The system as recited in claim 1,
    wherein said monitor monitors said first data line to determine when an amount of data being transmitted on said first data line within said second circuit has reached said threshold, and
    wherein said blocking mechanism prevents data from being transmitted on said first data line from said second circuit to said first circuit when the amount of data being transmitted on said first data line has reached said threshold.

4. The system as recited in claim 1 further comprising:
    a transmitter that transmits data on said first data line to first ports within said first circuit when the amount of data being transmitted on said first data line has reached said threshold.

5. The system as recited in claim 1 further comprising:
    a transmitter that transmits data on said second data line from said second ports on said first circuit to said fourth ports on said second circuit.

6. A method for controlling data flow, said method comprising the steps of:
    transmitting data across a first data line from a first circuit to a second circuit and within said first and second circuits;
    transmitting data across a second data line from said first circuit to said second circuit and within said first and second circuits;
    monitoring said first data line to determine when an amount of data being transmitted within said first circuit on said first data line has reached a threshold;
    preventing data from being transmitted on said first data line from said first circuit to said second circuit when the amount of data being transmitted on said first data line has reached said threshold; and
    transmitting data across said second data line from said first circuit to said second circuit when the amount of data being transmitted on said first data line has reached said threshold.

7. The method as recited in claim 6 further comprising the step of:
    transmitting data across said first data line to ports within said first circuit when the amount of data being transmitted on said first data line has reached said threshold.

8. The method as recited in claim 6 further comprising the step of:
    transmitting data on said first data line, from ports connected to first data line stations on said first circuit, to ports connected to first data line stations on said second circuit.

9. The method as recited in claim 6 further comprising the step of:
    transmitting data on said second data line, from ports connected to second data line stations on said first circuit, to ports connected to second data line stations on said second circuit.

10. The method as recited in claim 6 further comprising the step of:
    preventing data from being transmitted on said first data line, from ports connected to first data line stations on said first circuit, to ports connected to first data line stations on said second circuit, when the amount of data being transmitted on said first data line has reached said threshold.

11. The method as recited in claim 6 further comprising the step of:
    transmitting data on said second data line, from ports connected to first data line stations on said first circuit, to ports connected to first data line stations on said second circuit, when the amount of data being transmitted on said first data line has reached said threshold.

12. A system for controlling data flow, said system comprising:
    first transmitting means for transmitting data across a first data line from a first circuit to a second circuit;
    second transmitting means for transmitting data across a second data line from said first circuit to said second circuit;
    monitoring means for monitoring said first data line to determine when an amount of data being transmitted within said first circuit on said first data line has reached a threshold;
    first preventing means for preventing data from being transmitted on said first data line from said first circuit to said second circuit when the amount of data being transmitted on said first data line has reached said threshold; and
    third transmitting means for transmitting data across said second data line from said first circuit to said second circuit when the amount of data being transmitted on said first data line has reached said threshold.

13. The system as recited in claim 12 further comprising:
    third transmitting means for transmitting data across ports connected to first data line to stations within said first circuit when the amount of data being transmitted on said first data line has reached said threshold.

14. The system as recited in claim 12 further comprising:
third transmitting means for transmitting data on said first data line from ports connected to first data line stations on said first circuit to ports connected to first data line stations on said second circuit.

15. The system as recited in claim 12 further comprising:
third transmitting means for transmitting data on said second data line from ports connected to second data line stations on said first circuit to ports connected to second data line stations on said second circuit.

16. The system as recited in claim 12 further comprising:
second preventing means for preventing data from being transmitted on said first data line from ports connected to first data line stations on said first circuit to ports connected to first data line stations on said second circuit when the amount of data being transmitted on said first data line has reached said threshold.

17. The system as recited in claim 12 further comprising:
third transmitting means for transmitting data on said second data line from ports connected to first data line stations on said first circuit to ports connected to first data line stations on said second circuit when the amount of data being transmitted on said first data line has reached said threshold.

\* \* \* \* \*